Sept. 2, 1930.  A. P. STEINER  1,775,004
MULTIPLE GRINDING WHEEL MOUNTING
Filed April 3, 1928
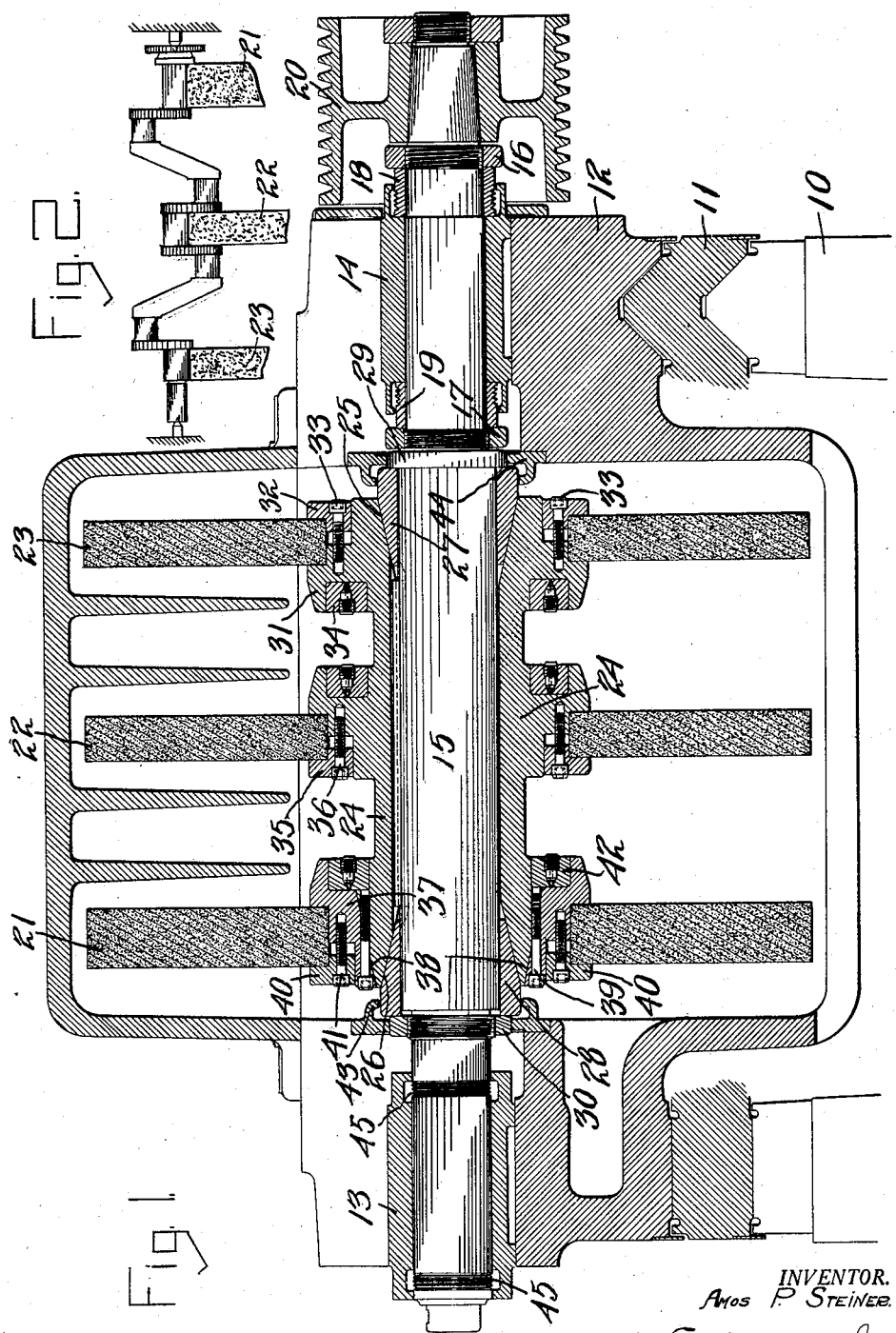
INVENTOR.
Amos P. Steiner.
BY
ATTORNEYS.

Patented Sept. 2, 1930

1,775,004

UNITED STATES PATENT OFFICE

AMOS P. STEINER, OF WAYNESBORO, PENNSYLVANIA, ASSIGNOR TO LANDIS TOOL COMPANY, OF WAYNESBORO, PENNSYLVANIA, A CORPORATION OF PENNSYLVANIA

MULTIPLE-GRINDING-WHEEL MOUNTING

Application filed April 3, 1928. Serial No. 267,061.

My invention relates to a method and means for mounting a plurality of grinding wheels on a single spindle. It is an object of the invention to provide means whereby the said wheels may be spaced far enough apart to grind the main bearings on a crank shaft or other analogous work, and at the same time not distort the spindle.

A further object is to provide means whereby the weight of the wheels may be so distributed as to create the least possible distortion of the wheel spindle and cause damage to the bearing.

Further objects of the invention will become apparent as the description proceeds.

Referring to the accompanying drawings which are made a part hereof and on which similar reference characters indicate similar parts, Figure 1 is a sectional front elevation, Figure 2 is a plan view showing the application of the invention to a crank shaft, having three main bearings.

In carrying out my invention I provide a wheel center tapered internally at each end, upon which the wheels are mounted. Fitted within this center are two short tapered sleeves adapted to fit in the ends of the tapered wheel center and having tapers corresponding to the internal taper of the wheel center. I provide also an auxiliary center mounted on a taper on one end of the main center to support the third wheel.

In known devices for mounting a plurality of grinding wheels on a single shaft it has been customary to mount the wheels on one end of the spindle. In mountings of this type it is difficult to mount the wheels so that the shaft will not be distorted and tend to rotate so as to throw the wheels out of alignment. When so mounted the end of the spindle rotates so as to describe the surface of a cone. It is obvious that the wheels could not be mounted any great distance apart when mounted on the end of the spindle. By mounting the wheels between the bearings, however, I make it possible to separate the wheels a much greater distance and still maintain the wheels in position to run smoothly.

Referring to the drawings, numeral 10 indicates the bed of a grinding machine. 11 is a sub-slide slidably mounted on the said bed, and 12 a wheel base slidably mounted on the sub-slide. The wheel base carries bearings 13 and 14, in which are supported a grinding wheel shaft 15. Thrust nuts 16 and 17 screwed upon the shaft in engagement with sleeves 18 and 19 bear against the opposite ends of the bearing 14 and take up end thrusts of the shaft. A pulley 20 on the end of the shaft provides suitable driving means for the shaft.

Grinding wheels 21, 22 and 23 are mounted upon a single center 24. This center has internally tapered ends as shown at 25 and 26. Into these ends tapered sleeves 27 and 28 are fitted so that the center 24 is supported at its ends only upon the tapered end sleeves 27 and 28. The end of the sleeve 27 engages with a collar 29 on the shaft 15. A thrust nut 30 is screwed against the tapered sleeve 28 at the other end. One sleeve is thus forced tightly within the tapered end of the center.

In mounting the wheels the wheel 23 is mounted upon the flange portion 31 of the center, and held in position by means of the ring 32 secured by bolts 33. The wheel is then balanced by means of adjustable weights 34 as shown in my co-pending application Serial No. 173,184, filed March 5, 1927. The wheel 22 is then put upon the center from the opposite end and secured by means of a similar ring 35 and bolts 36. This wheel is balanced as was the wheel 23. The wheel 21 is then mounted. This is done by first mounting the hub 37 upon the tapered seat 38 on the end of the center 24. The hub is then secured tightly in position by means of bolts 39. The wheel 21 is then mounted upon the peripheral seat of the hub and secured in position by means of securing ring 40 and bolts 41, such as those used in securing wheels 22 and 23 upon the flange on the center. The wheel 21 is then balanced by means of adjustable balancing weights 42 as done with the two wheels previously mounted. The hub 37 is removable in order to permit the wheel 22 to be inserted upon the sleeve over the hub.

Water seals 43 and 44 are provided at each end to prevent water escaping to the bearings. The shaft 15 is provided also with grooves 45 adapted to break up the oil film and prevent the escape of oil past the bearings, causing it to drop into an oil pocket at the end of the bearings, where it is returned to a reservoir by means not shown.

The operation of the device is believed to be sufficiently apparent without further explanation.

The weight of the grinding wheels it will be noticed is supported near the ends of the sleeve and therefore supported near the shaft bearings. The result of this is that the tendency of the wheels to flex the shaft is removed and the wheels will run steadily. Any number of additional wheels may be added in the same manner as wheel 21. Since this weight of all is supported on the end sleeves 27 and 28, the whole weight is carried by the spindle at a point near the bearings 13 and 14.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. Means for mounting a plurality of grinding wheels comprising a shaft, bearings for said shaft, a wheel center having the ends tapered inwardly, grinding wheels detachably mounted upon said center, sleeves having tapers corresponding to the said tapers in the wheel center, said sleeves being adapted to be positioned around the said shaft and within the ends of said center, to secure said center to the shaft, and means for securing the said sleeves against axial movement on the shaft whereby the said wheel center will be supported upon the said sleeves, substantially as set forth.

2. Means for mounting a plurality of grinding wheels on a single center comprising a spindle, a shoulder on said spindle, a tapered sleeve on said spindle adjacent said shoulder, a second sleeve on said spindle and tapered in the opposite direction, a wheel center having inwardly tapered ends adapted to be mounted on said sleeves, flanged hubs on said center adapted to receive grinding wheels, another flanged portion removably mounted on said center and adapted also to carry a grinding wheel, and means for mounting the above assembly on a wheel base, substantially as set forth.

3. Means for mounting a plurality of grinding wheels on a wheel center comprising a hub having a flanged portion, a ring removably secured to said hub and adapted to secure a grinding wheel upon said hub, a second hub of similar structure carried upon said center adjacent said first named hub, additional hubs removably secured to said wheel center, the said hubs having flanged portions adapted to receive grinding wheels, a ring detachably secured to each of said last named hubs for securing the grinding wheels thereon, and means for mounting the said center upon a spindle adjacent the bearings supporting said spindle, substantially as set forth.

4. Means for mounting a plurality of grinding wheels on a single center comprising a spindle, a shoulder on said spindle, a tapered sleeve on said spindle adjacent said shoulder, a second sleeve on said spindle and tapered in the opposite direction, means to force said second sleeve towards the first mentioned sleeve, a wheel center having inwardly tapered ends adapted to be mounted on said sleeves, an outwardly faced flanged hub on said center adjacent one end thereof and adapted to receive a grinding wheel, a similar but oppositely facing flanged hub formed on said center and spaced from said first mentioned hub and adapted to receive a grinding wheel and a detachable outwardly facing hub adapted to receive a grinding wheel secured to the opposite end of said center, and means for mounting the assembly on a wheel base, substantially as set forth.

5. Means for mounting a plurality of grinding wheels on a single center comprising a spindle, a shoulder on said spindle, a tapered sleeve on said spindle adjacent said shoulder, a second sleeve on said spindle and tapered in the opposite direction, means to force said second sleeve towards the first mentioned sleeve, a wheel center having inwardly tapered ends adapted to be mounted on said sleeves, an outwardly facing integral flange adjacent one end of said center, an inwardly facing integral flange in the center thereof, and a similarly facing detachable flange adjacent the opposite end of said center each adapted to receive a grinding wheel, and means for mounting the assembly on a wheel base, substantially as set forth.

6. A grinding wheel mounting comprising a spindle, a wheel center mounted on said spindle, said center having fixed flanges and a removable flange to provide for mounting a plurality of grinding wheels, substantially as set forth.

7. A grinding wheel mounting comprising a base, a spindle mounted therein, said spindle having tapered sleeves to form bearing elements for a spindle, a wheel center mounted on said sleeve, fixed flange portions on said center for mounting grinding wheels thereon and removable flanges for mounting additional grinding wheels, substantially as set forth.

In witness whereof, I have hereunto set my hand at Waynesboro, Pennsylvania, this 2nd day of April, A. D. nineteen hundred and twenty-eight.

AMOS P. STEINER.